United States Patent [19]

Jourdain et al.

[11] Patent Number: 4,778,109
[45] Date of Patent: Oct. 18, 1988

[54] ADJUSTABLE TWO DIMENSIONAL NOZZLE FOR AIRCRAFT JET ENGINES

[75] Inventors: Gérard E. A. Jourdain, Corbeil-Essonnes; Marc G. Loubet, Nandy; Jean-Michel Payen, Le Mee S/Seine, all of France

[73] Assignee: Societe Nationale d'Etude et de Construction de Moteurs d'Aviation (SNECMA), Paris, France

[21] Appl. No.: 133,886

[22] Filed: Dec. 16, 1987

[30] Foreign Application Priority Data

Dec. 17, 1986 [FR] France .................. 86 17632

[51] Int. Cl.⁴ .................. F02K 1/12; B63H 11/10
[52] U.S. Cl. .................. 239/265.27; 239/265.35; 60/230; 244/110 B
[58] Field of Search .................. 60/228, 226.1, 230; 244/110 B, 23 D, 125; 239/265.19, 265.25, 265.27, 265.35, 265.33

[56] References Cited

U.S. PATENT DOCUMENTS

| 3,098,352 | 7/1963 | Taub et al. | 239/265.37 X |
| 4,241,876 | 12/1980 | Pederson | 244/12.5 X |
| 4,245,787 | 1/1981 | Freid | 239/265.41 |
| 4,310,121 | 1/1982 | Basinski, Jr. | 239/265.33 |
| 4,361,281 | 11/1982 | Nash | 239/265.37 |
| 4,605,169 | 8/1986 | Mayers | 244/23 D X |
| 4,690,329 | 9/1987 | Maddon | 239/265.19 |

FOREIGN PATENT DOCUMENTS 1479351 5/1967 France .
2483523 6/1981 France .
2155552A 9/1985 United Kingdom .

Primary Examiner—Andres Kashnikow
Assistant Examiner—Kevin Patrick Weldon
Attorney, Agent, or Firm—Bacon & Thomas

[57] ABSTRACT

An adjustable two-dimensional nozzle is disclosed in which simplified control means are located away from the flow of gasses through the nozzle. The nozzle includes a movable frame located outside of fixed sidewalls and has pivotally attached thereto a pair of upstream or converging nozzle flaps. Upstream edges of the upstream flaps are attached to the movable frame such that the flaps pivot about axes extending substantially perpendicular to the longitudinal axis of the nozzle. Downstream or diverging flaps are attached to the downstream edges of the upstream flaps such that these flaps also pivot about axes extending substantially perpendicular to the longitudinal axis of the nozzle. A cam member extends between each of the movable frames and each downstream flap to control the angular variations of the flaps during movement of the frame. The flap arrangements are symmetrically arranged with respect to a plane passing through the longitudinal axis of the nozzle, such that translational movement of the frames will alter the cross-section of the nozzle in a symmetrical manner with respect to the plane. If the frame is rotated about its pivot attachment, the nozzle flaps will be asymmetrically adjusted and may be utilized to vector the thrust of the gasses emanating from the nozzle.

14 Claims, 4 Drawing Sheets

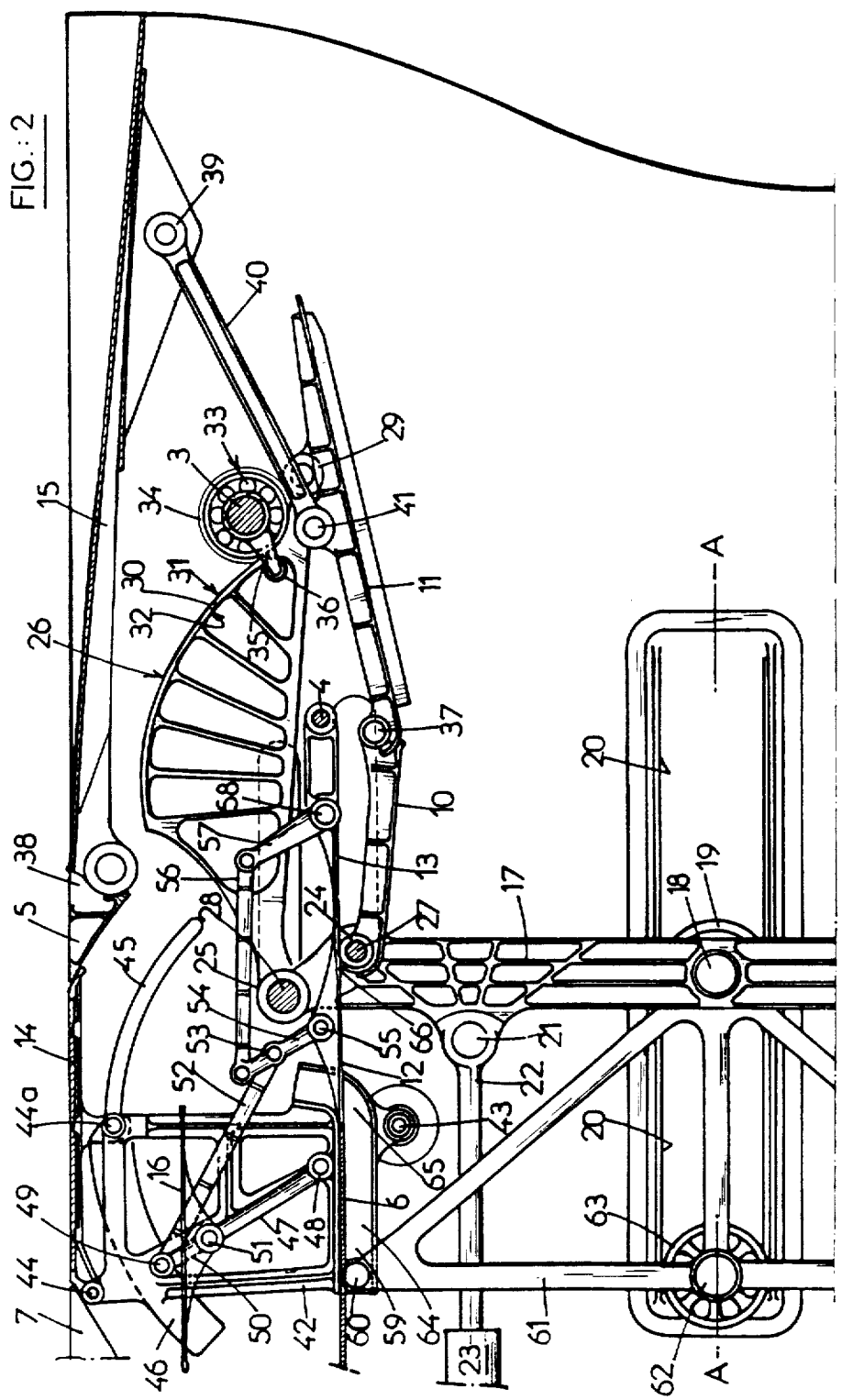

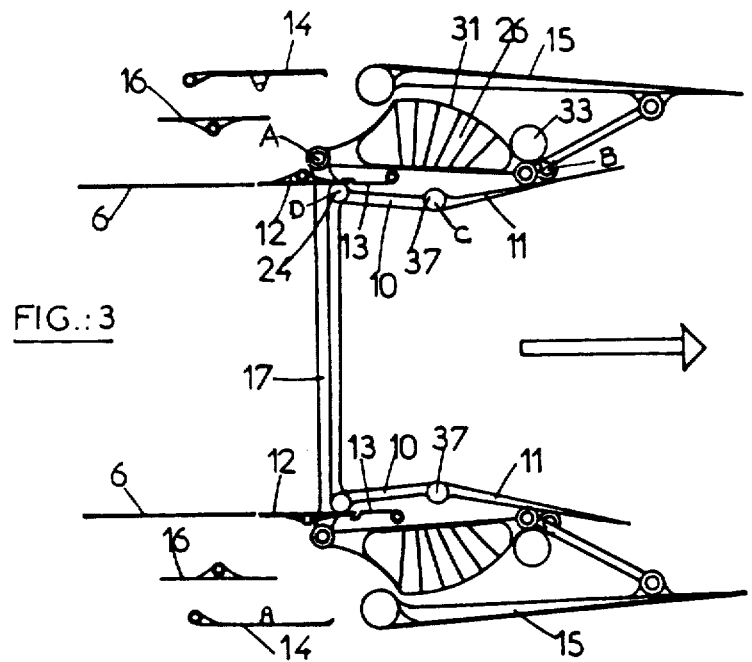
FIG.:3
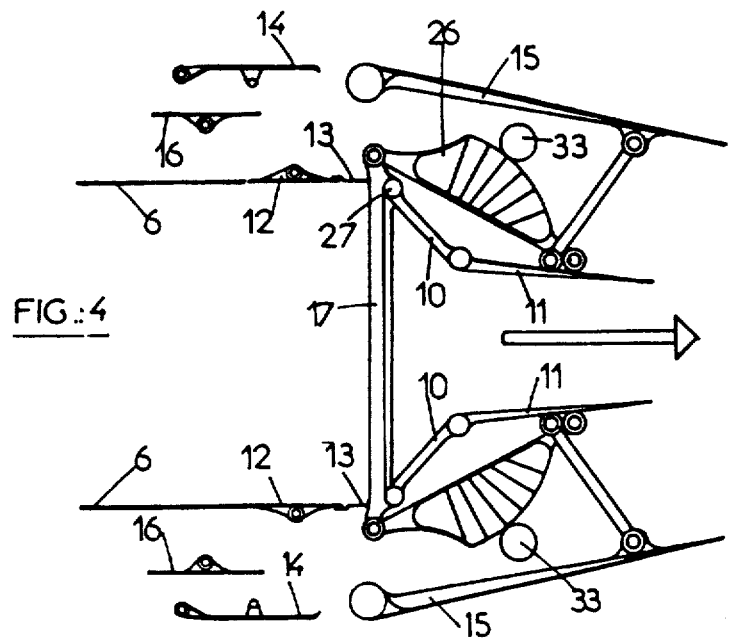
FIG.:4

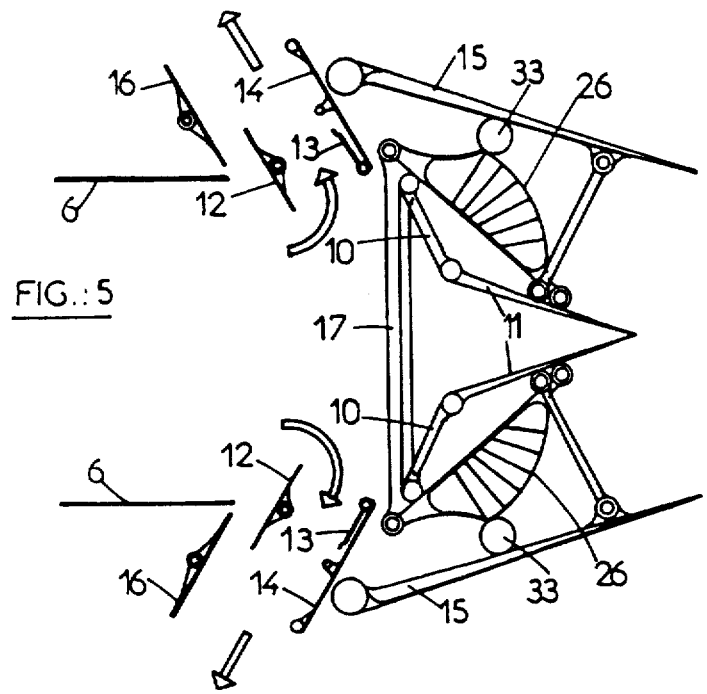
FIG.: 5
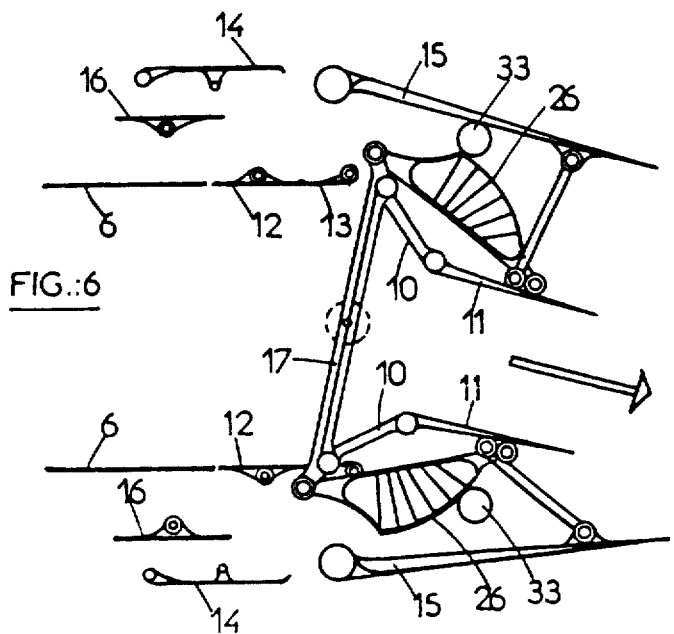
FIG.: 6

ADJUSTABLE TWO DIMENSIONAL NOZZLE FOR AIRCRAFT JET ENGINES

BACKGROUND OF THE INVENTION

The present invention relates to an adjustable two-dimensional nozzle for aircraft jet engines, more particularly such a nozzle which has the capabilities of variably adjusting the cross-section in addition to variably adjusting the direction of gasses exiting through the nozzle.

An adjustable nozzle must be able to vary its general converging-diverging cross-sectional shape in order to optimize the thrust produced by the aircraft engine. Furthermore, the nozzle must also be able to redirect the flow of gasses to a thrust reversing direction.

To achieve these results, two-dimensional nozzles have been developed which include a structure having a square or rectangular cross-section with two opposite, stationary walls interconnected by sets of pivotable flaps which pivot about axis extending substantially perpendicular to the fixed walls in order to vary the nozzle's shape or redirect the flow of gasses. Typically, the sets of flaps each comprise at least one upstream or converging flap; at least one downstream or divergent flap having an upstream edge pivotally attached to the downstream edge of the upstream flap; and at least one thrust reversing flap capable of moving from a position in which it forms a part of the outer nozzle wall to a position wherein it opens so as to direct the gasses through the wall to provide a thrust reversing effect.

Such nozzles typically include a control system formed of actuators and rods to move the flaps, wherein the control system is located on the outer surface of the fixed walls of the nozzle.

British Pat. No. 2,155,552 and French Pat. No. 2,483,523 show typical examples of this type of two-dimensional nozzle. As illustrated in these documents, the known systems have required a complex and delicate control system. In the British patent, fourteen hydraulic actuators, each disposed outside of the fixed walls of the nozzles are required to position the six flaps. In the French patent, the nozzle structure requires only one drive means for each of the movable flaps (a total of eight actuators), but the drive means or the primary flaps are located within the flaps and are subject to extremely high operating temperatures, since these flaps come into direct contact with the exhaust gasses of the engine.

Other drawbacks of the known systems include variance of the load on the drive means along the length of the actuator stroke, and the fact that the downstream flap has an outer surface which also forms part of the outer nozzle surface. This simplistic design prevents the formation of a chanel to direct cooling air onto the flaps.

SUMMARY OF THE INVENTION

The present invention provides an adjustable two-dimentional nozzle which obviates the drawbacks of the known devices. In particular, the control means are simplified and are located away from the flow of gasses through the nozzle to protect the control means against overheating.

The nozzle according to the present invention includes a movable frame located outside of the fixed sidewalls and having pivotally attached thereto a pair of upstream or converging nozzle flaps. The upstream edges of the upstream flaps are attached to the movable frame such that the flaps pivot about axes extending substantially perpendicular to the longitudinal axis of the nozzle. Downstream or diverging flaps are attached to the downstream edges of the upstream flaps such that these flaps also pivot about axes extending substantially perpendicular to the longitudinal axis of the nozzle.

A cam member extends between each of the movable frames and each downstream flap such that a first portion of the cam member is pivotally attached to the frame while a second portion thereof is pivotally attached to the downstream flap. Stationary cam rollers attached to the fixed sidewalls bear against a cam surface formed on each of the cam members. Link rods also connect the downstream flap to an outer flap which, in turn, has its upstream edge pivotally attached to the fixed nozzle structure. Thus, as the movable frame moves in a direction substantially parallel to the longitudinal axis of the nozzle, the cam member and the link rods adjust the relative convergence and divergence of the upstream and downstream flaps, respectively, so as to vary the cross-sectional shape of the nozzle.

The movable frames are also mounted so as to pivot about a central axis extending substantially transversely of the longitudinal axis. Pivoting of the frame members serves to direct the flow of gasses passing therethrough at an angle with respect to the longitudinal axis of the nozzle. Thus, the nozzle according to the invention has not only a variable cross-sectional shape, they may also be utilized for thrust vectoring.

The invention also emcompasses a nozzle having at least one thrust reversing flap and provides a means for opening the thrust reversing flap when the downstream nozzles are positioned so as to completely close off the nozzle passage so as to redirect the gasses in a thrust reversing direction. Means interconnecting the movable frame with the thrust reversing flaps allows the frame to move over an initial portion of its travel without affecting any movement in the thrust reversing flaps to allow the upstream and downstream flaps to vary the nozzle's cross-sectional shape. It is only at the extremity of travel of the movable frame, when the downstream flaps have effectively closed the exhaust nozzle that the mechanism opens the thrust reversing flaps.

The geometry of the system is such that lines connecting the pivot axes of the first portion of the cam, the second portion of the cam, the pivot axis of the connection between the upstream and downstream flags and the pivot connection of the upstream flap with the frame, in the plane of one of the fixed sides, defines a quadrilateral having at least two opposite sides of different lengths. The quadrilateral so formed is not a deforming parallelagram and, therefore, if one of the sides of the quadrilateral undergoes solely translational movement, such as the movable frame, then the opposite side, namely, the downstream flap, will not only undergo translation, but will also undergo rotation so as to change its angular orientation. The upstream flap also assumes varying angular orientation during the translational movement of the frame.

Preferably, the flap arrangements are symetrically arranged with respect to a plane passing through the longitudinal axis of the nozzle, such that translational movement of the frames will alter the cross-section of the nozzle in a symetrical manner with respect to the plane. However, if the frame is rotated about its pivot attachment, the nozzle flaps will be asymetrically adjusted and may be utilized to vector the thrust of the gasses emanating from the nozzle.

The frame located on one side of the nozzle is preferably linked to the frame on the opposite side of the nozzle such that it forms a rigid rectangular structure. This structure provides redundancy for the control system, since the actuators on one side of the nozzle will effectively move frames on both sides of the nozzle in the event that one control system should fail.

A BRIEF DESCRIPTION OF THE DRAWINGS

FIG. 2 is a partial, longitudinal sectional view of the nozzle shown in FIG. 1.

FIGS. 3-6 are schematic diagrams of the nozzle structure shown in FIGS. 1 and 2 illustrating various flap orientations.

DETAILED DESCRIPTION OF THE PREFERRED EMBODIMENT

Figure 1:
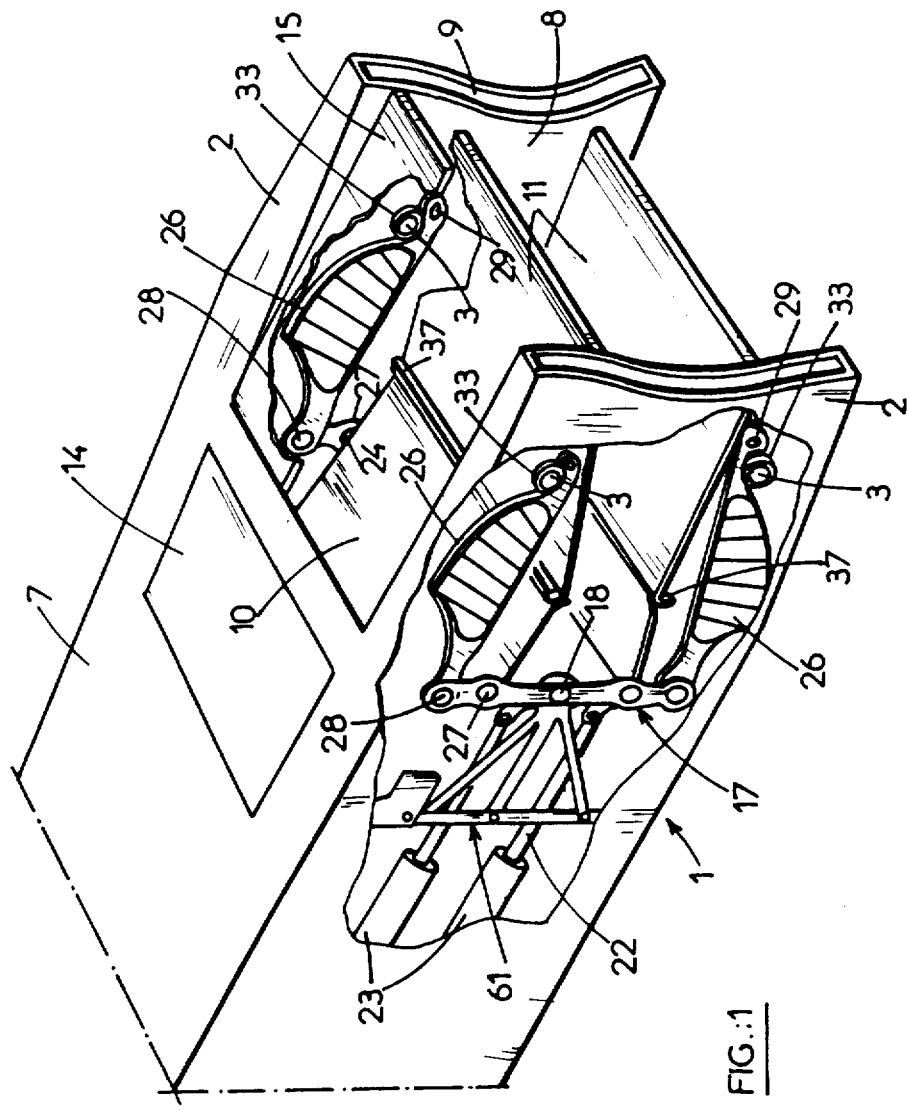
FIG. 1 is a partial, prespective view, partially broken away of an exhaust nozzle according to the invention.

As illustrated in FIGS. 1 and 2, nozzle 1 has a generally rectangular cross-section with fixed opposite sides 2 interconnected by cross members 3, 4 and 5. The cross members are mounted symetrically with respect to a substantially horizontal plane AA which passes through the longitudinal axis of the nozzle (see FIG. 2). Upstream of the nozzle assembly, the fixed sides 2 are transversely connected by inner and outer panels 6 and 7, respectively. Each of the fixed sides 2 comprise an inner wall 8, the inner surface of which defines the lateral boundaries of the exhaust gas passage and an outer wall 9 spaced therefrom. The control mechanism for the flaps, which will be described in more detail hereafter, is located in the space between the inner walls 8 and the outer walls 9.

The movable flaps are also symetrically arranged with respect to plane AA passing through the longitudinal center line of the nozzle and, although only the upper flaps and the upper portion of the control system will be described with reference to FIG. 2, it is to be understood that the lower portion of the nozzle has identical flaps and an identically arranged control mechanism.

The movable portions of the nozzle comprise upstream flaps 10 and downstream flaps 11 which change their angular orientation to vary the cross-sectional shape of the nozzle. Thrust reversing flaps 12 and 13 serve as an extension of inner wall 6 during normal operation of the nozzle, but pivot outwardly when the downstream flaps 11 close of the nozzle to direct the gasses in a thrust reversing direction. A third thrust reversing flap 14 is, under normal operation, generally co-planar with outer wall 7. This flap also opens outwardly during the thrust reversing portion of the operating cycle. A cold or outer flap 15 is pivotally attached to the cross member 5 at its upstream edge and also serves as an extension of the outer panel 7 in a downstream direction beyond the downstream flap 11.

A fourth thrust reversing flap 16 is located between the ends of the inner and outer panels 6 and 7, respectively, and normally extends generally parallel thereto. However, when the nozzle is in its thrust reversing configuration, flap 16 moves so as to cover the space between inner and outer panels 6 and 7 to prevent the thrust reversing gasses from passing between these elements.

The movable flaps extend generally transversely across the nozzle between the inner walls 8 of fixed side walls 2. The inner walls 8 may have indentations to accommodate the pivoting attachments of the movable flaps throughout their range of motion. Known sealing devices may be interposed between the movable flaps and the inner walls 8 to prevent the leakage exhaust gasses therebetween and to improve the efficiency of the nozzle.

Although the control system is shown on only one side of the nozzle in FIGS. 1 and 2, it is to be understood that an identical control system is located on the opposite side of the nozzle. A frame 17 is movably attached to outer side wall 9 via pivot 18, roller 19 and guide member 20. Frame 17 is pivotally attached to the roller 19 by pivot 18. Roller 19 is guided by member 20 so as to move longitudinally in the plane AA passing through the longitudinal axis of the nozzle. Guide member 20 is mounted on the outer wall 9 of the fixed side wall 2.

The control mechanism includes a pair of actuators 23, each having extendable and retractable rods 22 connected to the frame 17 by hinge means 21. The actuators 23 are mounted upstream from the frame 17 and serve to move the frame with respect to the guide member 20.

Upstream flaps 10 are pivotally connected to frame 17 at their upstream edges by hinge 24. Hinge member 25 serves to pivotally connect a first portion of cam member 26 to the frame 17, while a second portion of the cam member 26 is pivotally connected to the downstream flap 11 by hinge 29.

Cross bars 27 and 28 extend coaxially with hinge members 24 and 25, respectively, and serve to connect the frame 17 on one side of the nozzle to the frame 17 on the opposite side of the nozzle. This forms a substantially rigid rectangular structure which permits the actuators 23 on one side of the nozzle to actuate both frames 17 in the case of failure of one or more of the actuators 23 on the opposite side of the nozzle. This provides a redundant safety feature and increases the reliability of the nozzle.

Cam member 26 extends in a generally vertical plane and comprises a rib 30 which extends generally perpendicular to this plane and defines a primary cam surface 31. Cam surface 31 is formed such that it comprises a generally circular cam surface portion near the hinge 29 and an oppositely curved portion extending away from the generally circular portion. The opposite side of rib 30 forms a secondary cam surface 32 adapted to be contacted by roller 36 mounted on arm 35 which, in turn, is attached to cross member 3. Roller 36 bearing agaisnt secondary cam surface 32 maintains contact betwen the primary cam surface 31 and the roller 34. Roller 34 is rotatably supported by bearings 33 and is mounted so as to rotate about cross member 3. The thrust of the exhaust gasses bearing against flaps 10 and 11 generally serves to maintain contact between the roller 34 and the cam surface 31, but roller 36 maintains this contact even during those periods of operation when the thrust may be insufficient to do so.

Downstream flap 11 is pivotally attached to the downstream edge of upstream flap 10 by hinge shaft 37. The length of shaft 37 is such that it does not extend through the inner walls 8 of the fixed sides 2. Downstream flap 11 is also interconnected to outer or cold flap 15 by link rods 40. Pivot connections 39 and 41 serve to connect the ends of link rods 40 with the outer flap 15 and the downstream flap 11, respectively. Outer flap 15 is pivotally attached at its upstream edge to cross member 5 by clevis joint 38. The relative positions of pivot connections 29 and 41 on the downstream flap 11 as well as the length of link rod 40 may be determined for each individual nozzle application to optimize the distance between the downstream end of the downstream flap 11 and the outer flap 15 to reduce the base drag.

The mechanism for actuating the thrust reversing flaps comprises a pivoting member 42 pivotally mounted to the outer wall 9 of fixed side 2 by pivot 43. Member 42 is fixedly joined to the thrust reversing flap 14 (the external sealing flap) by means of shafts 44 and 44a. The ends of shaft 44a pass through the inner walls 8 of the fixed sides 2 through an arcuate opening 45 and may be provided with sealing member 46.

The pivoting member 42 also is connected to the remaining thrust reversing flaps via a linkage mechanism such that all of the flaps are simultaneously actuated. The link system includes first link rod 47 attached to member 42 at joint 48 and at joint 49 to a second link rod 50 which, in turn, is fixedly attached to intermediate thrust reversing flap 16. The pivoting movement of member 42 moves the first link rod 47 which, in turn, causes the intermediate thrust reversing flap 16 to pivot about its attachment shaft 51.

A third link rod 52 is connected to link rod 47 at joint 49 at one end and, at joint 53, to a fourth link rod 54, which, in turn, is fixedly attached to the first thrust reversing flap 12. Thrust reversing flap 12 is caused to pivot about its attachment axis 55 as member 42 pivots about is attachment point 43. A fifth link rod 56 connects fourth link rod 54 to a sixth link rod 57 which, in turn, is fixedly attached to the second thrust reversing flap 13 which pivots about its attachment shaft 58. The lengths of the various link rods are computed for each specific nozzle application such that the thrust reversing flaps are simultaneously actuated and remain approximately mutually parallel while moving between their closed positions and their open positions.

A guide rail 59 is fixedly attached to pivoting member 42 and serves to attach the pivoting member 42 to the pivot attachment point 43. Guide rail 59 defines a guide path comprising a substantially straight portion 64, extending generally parallel to the longitudinal axis of the nozzle and obliquely extending portion 65. Follower roller 60 is supported so as to be movable along the guide path and is attached to mounting member 61. Mounting member 61 is, in turn, attached to frame 7 at pivot point 18 such that frame 7 may pivot about this point with respect to the mounting frame 61. Mounting frame 61, however, is constrained so as to only undergo translational movement in a direction generally parallel to the longitudinal axis of the nozzle. This is achieved by attaching roller 63 to the mounting frame at point 62 such that roller 63 also is guided by guide member 20. Thus, rollers 19 and 63, and their engagement with guide member 20 serves to prevent any rotation of mounting member 61.

It is preferred that the distance between the roller follower 60 and the plane AA passing through the longitudinal center line of the nozzle be equal to the sum of the distances from the axis of the straight portion 64 of the guide path 59 to the pivot point 43 and the distance from the pivot point 43 to the plane AA. As a result, the mounting member 61 and the movable frame 17 can be displaced over a substantial distance without causing the member 42 to pivot, thereby operating the thrust reversing flaps. This enables the nozzle geometry to be varied without actuating the thrust reversing system.

The operation of the system will now be described with particular reference to FIGS. 2–6. It will be assumed that the positions of the flaps are as shown in FIG. 2 with the thrust reversing flaps 13 and 14 extending generally co-planar with inner wall 6 and thrust reversing flap 14 extending generally co-planar with outer wall 7. It will also be assumed that the upstream edge of upstream flap 10 is generally tangent to the plane defined by inner wall 6 and the thrust reversing flaps 12 and 13. Flexible sealing means 66 may be provided so as to seal the area between the thrust reversing flaps 12 and 13, and the attachment point 27 of the upstream nozzle 10 to prevent the leakage of gasses through this area.

With the nozzle in its widest opening, the rods 22 of the actuators 23 are retracted to their extreme positions as shown in FIG. 2. In this position, upstream flaps 10 are slightly convergent, while downstream flaps 11 are slightly divergent. If it is desired to alter the shape of the nozzle, while still maintaining the thrust substantially coincident with the longitudinal axis of the nozzle, the rods 22 of actuators 23 are all extended an equal amount so as to translate frame 17 in a downstream direction, as illustrated in FIGS. 3 and 4. The interaction of cam 26 with roller 33, as well as the interaction of link 40 between the downstream flap 11 and cold flap 15 moves the flaps 10 and 11 to the positions shown in FIG. 4. In this orientation, upstream flaps 10 are highly convergent while downstream flaps 11 are slightly convergent. During this movement of frame 17, the thrust reversing flaps are retained in their closed positions, since follower roller 60 is moving along the straight portion 64 of guide path 69. Thus, member 42 is not caused to pivot about its attachment point.

At the position shown in FIG. 4, the cross bar 27 attaching upstream edge of upstream flap 10 to the frame 17 is generally at the downstream edge of thrust reversing flap 13. As the motion of frame 17 continues in a downstream direction, the convergence of the flaps 10 and 11 increases such that they tend to close the nozzle, as illustrated in FIG. 5. However, before this point is reached, follower roller 60 encounters the obliquely extending portion 65 of guide path 59. Thus, as further movement of frame 17 takes place in this direction, follower roller 60 causes member 42 to pivot about its attachment point 43, thereby opening the thrust reversing flaps 12, 13, 14 and 16. The opening of these flaps redirects the gasses in a direction which exerts a reversing thrust on the nozzle structure.

It is also possible to utilize the control system and nozzle according to this invention to vector or direct the thrust to a position which is not coincident with the longitudinal axis of the nozzle. If it is assumed that the nozzle structure is in the orientation shown in FIG. 4, pivoting the frame member 17 about pivot point 18, as illustrated in FIG. 6, will serve to vector the exiting gasses from the nozzle and to provide a vector thrust. Pivoting member 17 is accomplished by extending one of the rods 22 of one of the actuators 23 further than the other rod on the same side of the nozzle. Pivoting the frame 17 about pivot point 18 changes the relative positions between the upper and lower cam members 26, thereby placing the upper flaps 10 and 11 in a different orientation from the lower flaps 10 and 11. As long as the pivoting takes place while the follower roller 60 is in the straight portion 64 of guide path 59, the thrust reversing flaps will remain closed.

As shown in FIG. 3, points A, B, C and D are located at the intersection of the pivot axes of hinge points 24, 25, 29 and 37 with a generally vertically extending plane passing through the nozzle. Lines interconnecting points A, B, C and D form a quadrilateral having at least two opposite sides of different lengths.

The foregoing is provided for illustrative purposes only and should not be construed as in any way limiting this invention, the scope of which is defined solely by the appended claims.

What is claimed is:

1. An exhaust nozzle for a gas turbine engine having a longitudinal axis and a generally rectangular cross-section comprising:
   (a) a first pair of opposite, fixed sides;
   (b) a second pair of opposite, movable sides to vary the nozzle cross-section and the direction of gasses passing through the nozzle, each second pair of movable sides comprising:
      (i) an upsream flap extending between the fixed sides having an upstream edge and a downstream edge; and,
      (ii) a downstream flap having an upstream edge pivotally attached to the downstream edge of the upstream flap at a first point;
   (c) at least one thrust reversing flap movable between open and closed positions; and,
   (d) a control system located on both sides of the nozzle for controlling the angular positions of the upstream flaps, the downstream flaps and the at least one thrust reversing flap each control system comprising:
      (i) a frame attached to a fixed side so as to be movable in a direction substantially parallel to the longitudinal axis of the nozzle and to pivot about a pivot axis extending substantially perpendicular to the longitudinal axis;
      (ii) actuating means connected to the frame;
      (iii) cam members defining cam surfaces, each cam member having a first portion attached to the frame at a second point and a second portion attached to a downstream flap at a third point;
      (iv) stationary cam rollers attached to the fixed sides, operatively contacting the cam surfaces; and
      (v) hinge means pivotally attaching the upstream edge of the upstream flaps to the frame at a fourth point such that the upstream flap pivots about an axis extending generally perpendicular to the longitudinal axis; whereby lines interconnecting the first, second, third and fourth points, in a plane of a fixed side form a quadrilateral having two opposite sides of different lengths.

2. The exhaust nozzle according to claim 1 wherein the actuating means for the control system comprises a pair of actuating cylinders each having an extendable and retractable rod attached to the frame.

3. The exhaust nozzle according to claim 2 wherein the actuating cylinder rods are attached to the frame on either side of the pivot axis.

4. The exhaust nozzle according to claim 2 wherein the pivot axis of the frame extends substantially perpendicular to the fixed sides of the nozzle.

5. The exhaust nozzle according to claim 2 further comprising means interconnecting the frames located on either side of the nozzle such that the frames and interconnecting means form a rigid, generally rectangular structure.

6. The exhaust nozzle according to claim 1 further comprising:
   (a) cam roller mounting means; and
   (b) guide means attached to the cam roller mounting means and operatively associated with a cam member so as to retain the cam surface in contact with the cam roller.

7. The exhaust nozzle according to claim 6 wherein the guide means comprises:
   (a) an arm attached to the cam roller mounting means; and,
   (b) a secondary roller attached to the arm so as to bear against a portion of the associated cam member.

8. The exhaust nozzle according to claim 1 further comprising:
   (a) a pair of outer flaps pivotally attached at upstream edges to a fixed portion of the nozzle; and
   (b) link means connecting a downstream portion of each of the outer flaps to an adjacent downstream flap.

9. The exhaust nozzle according to claim 1 further comprising connecting means interconnecting the movable frames with the at least one thrust reversing flap such that, during initial movement of the frames the at least one thrust reversing flap is in the closed position and upon continued movement of the frames in the same direction, the at least one thrust reversing flap is moved to the open position.

10. The exhaust nozzle according to claim 9 wherein the connecting means comprises:
    (a) guide rail means defining a guide path and pivotally attached to the fixed sides of the nozzle;
    (b) follower means associated with the guide rail so as to be movable along the guide path;
    (c) mounting means attached to the follower means and to a frame such that as the frame moves, the follower means moves along the guide path; and,
    (d) linkage means connecting the guide rail means to the at least one thrust reversing flap such that, as the guide rail pivots, the at least one thrust reversing flap moves between its closed and open positions.

11. The exhaust nozzle according to claim 10 wherein the guide path has a first segment extending substantially parallel to the longitudinal axis of the nozzle and a second segment extending obliquely thereto.

12. The exhaust nozzle according to claim 11 further comprising means to slidably attach the mounting means to the fixed sides such that the mounting means undergoes only translational movement.

13. The exhaust nozzle according to claim 12 further comprising means to pivotally attach the mounting means to the frame at the pivot axis of the frame.

14. The exhaust nozzle according to claim 1 wherein each fixed side comprises an inner wall and an outer wall defining a space therebetween and wherein the control system is located in the space between the inner and outer walls.

* * * * *

UNITED STATES PATENT AND TRADEMARK OFFICE
CERTIFICATE OF CORRECTION

PATENT NO. : 4,778,109

DATED : October 18, 1988

INVENTOR(S) : JOURDAIN ET AL

It is certified that error appears in the above-identified patent and that said Letters Patent is hereby corrected as shown below:

Col. 1, line 45, "or" should be --for--.

Col. 1, line 55, "chanel" should be --channel--.

Col. 2, line 31, "they" should be --it--.

Col. 2, line 63, "symetrically" should be --symmetrically--.

Col. 2, line 67, "symetrical" should be --symmetrical--.

Col. 3, line 1, "asymetrically" should be --asymmetrically--.

Col. 3, line 13, "prespective" should be --perspective--.

Col. 3, line 26, "symetrically" should be --symmetrically--.

Col. 3, line 38, "symetrically" should be --symmetrically--.

Col. 3, line 52, "of" should be --off--.

Col. 4, line 51, "agaisnt" should be --against--.

Col. 4, line 52, "betwen" should be --between--.

Signed and Sealed this

Fourth Day of April, 1989

Attest:

DONALD J. QUIGG

*Attesting Officer*

*Commissioner of Patents and Trademarks*